E. D. TREANOR.
WINDING MACHINE.
APPLICATION FILED MAR 26, 1921.
1,413,366.  Patented Apr. 18, 1922.
3 SHEETS—SHEET 2.
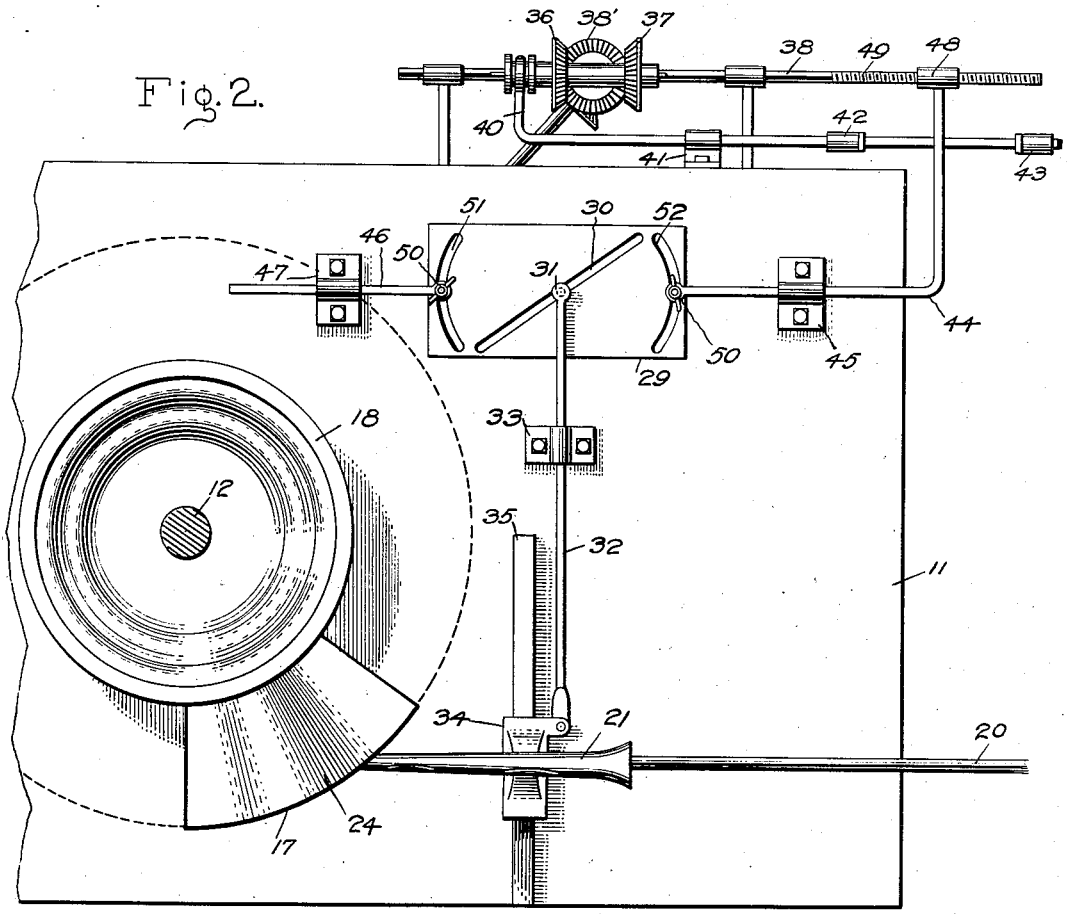
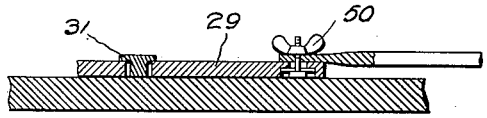
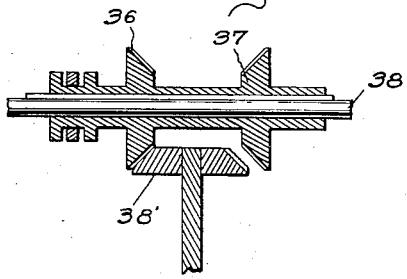
Inventor:
Edward D. Treanor,
by Albert G. Davis
His Attorney.

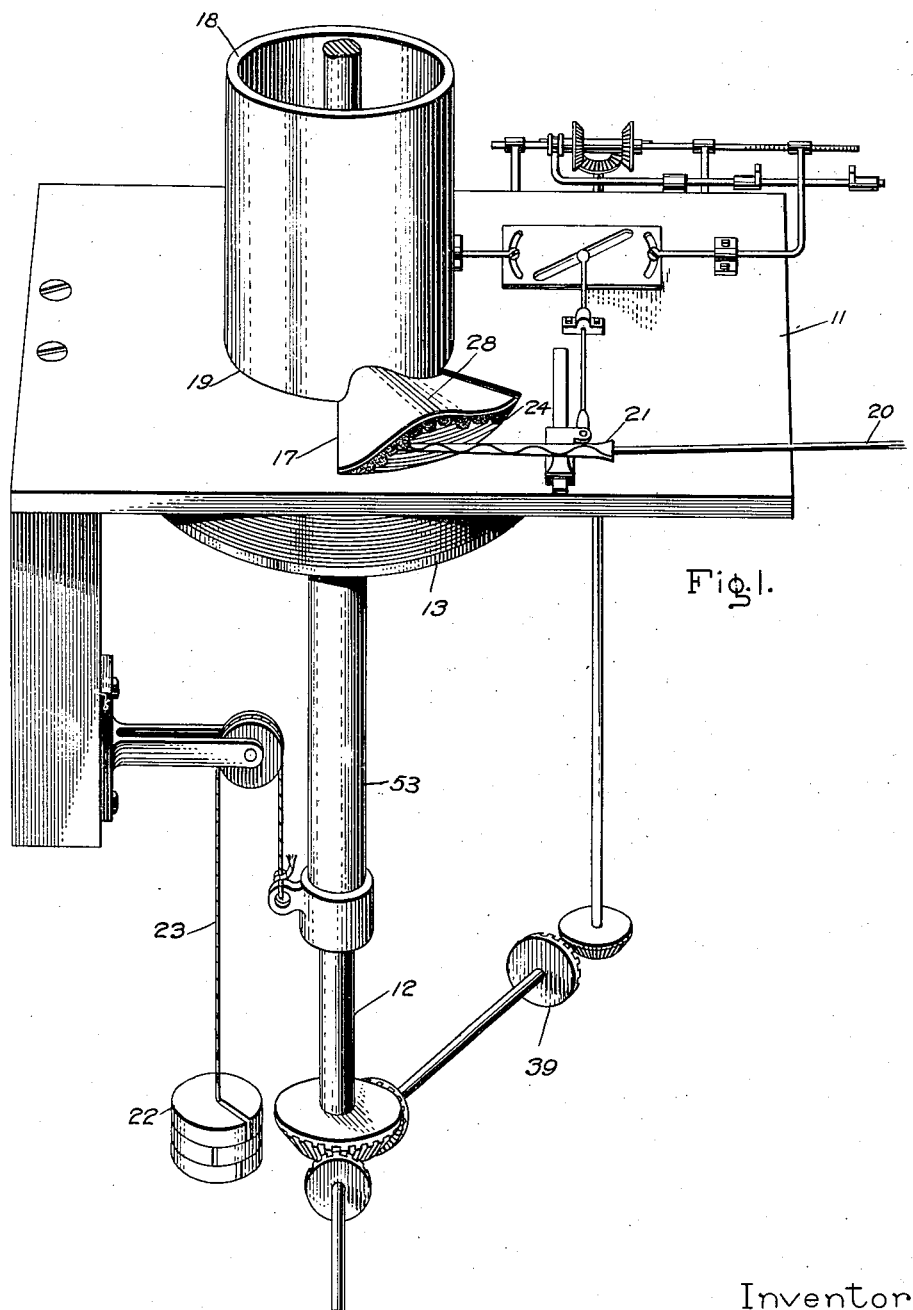

E. D. TREANOR.
WINDING MACHINE.
APPLICATION FILED MAR 26, 1921.
1,413,366. Patented Apr. 18, 1922.
3 SHEETS—SHEET 3.
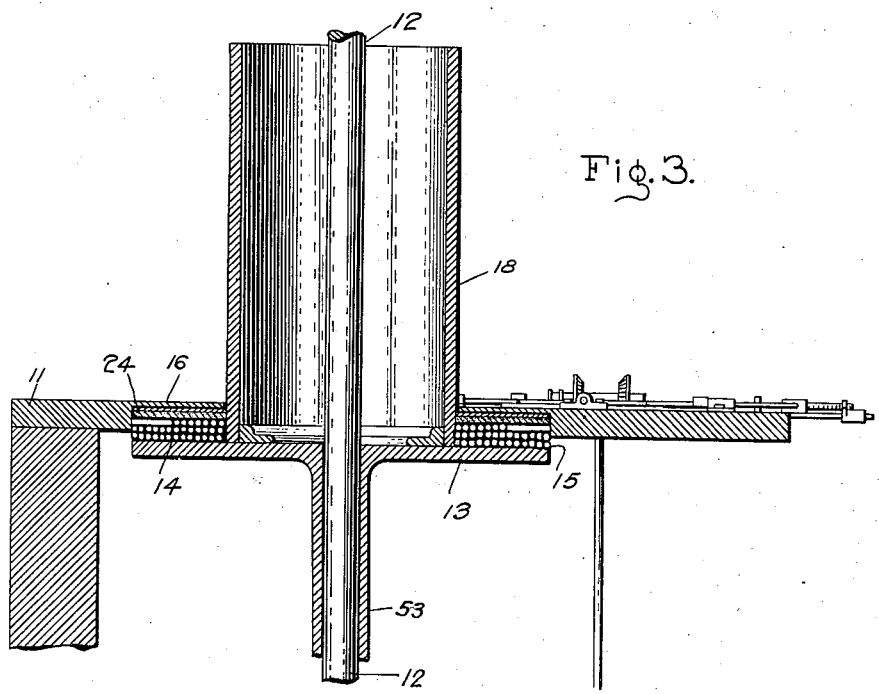
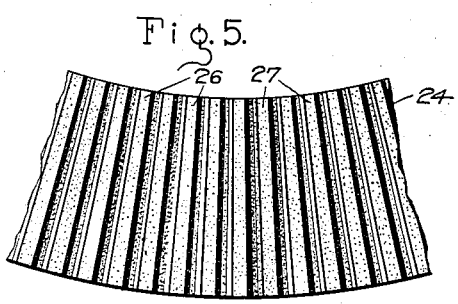
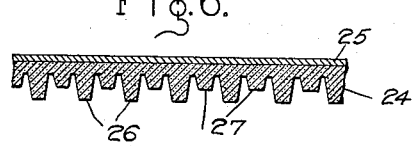
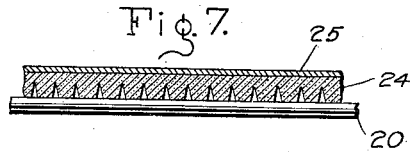
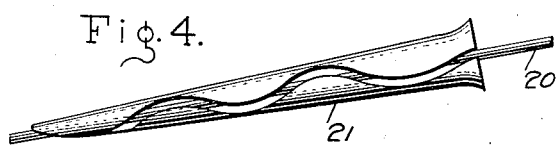
Inventor:
Edward D. Treanor,
by *Albert G. Davis*
His Attorney.

UNITED STATES PATENT OFFICE.

EDWARD D. TREANOR, OF PITTSFIELD, MASSACHUSETTS, ASSIGNOR TO GENERAL ELECTRIC COMPANY, A CORPORATION OF NEW YORK.

WINDING MACHINE.

1,413,366.   Specification of Letters Patent.   Patented Apr. 18, 1922.

Application filed March 26, 1921. Serial No. 455,848.

*To all whom it may concern:*

Be it known that I, EDWARD D. TREANOR, a citizen of the United States, residing at Pittsfield, county of Berkshire, State of Massachusetts, have invented certain new and useful Improvements in Winding Machines, of which the following is a specification.

This invention relates to winding machines, and more particularly to winding machines adapted to wind conductors into flat spirals.

In the winding of coils for such electrical apparatus, for example, as transformers, it is of the highest importance to save as much space as possible. The insulation of a conductor, as well as the insulation between layers of the conductors in the coil serve to occupy a good portion of this space. To reduce the amount of the insulation and thus the amount of space, various expedients have been suggested. Having given a coil of certain dimensions and number of turns, it is evident that if the number of layers be multiplied the voltage between layers is reduced and less insulation is needed. In ordinary coils having a cylindrical form, the number of layers may be multiplied by winding the coils in flat spirals starting at one end of the spool and continuing in this way to the end, instead of winding them as is usually done in cylindrical layers which are parallel to the axis of the spool. Mechanical difficulties, however, are encountered in attempting to wind a coil in this way. For example, it is difficult to support those layers which are already wound while the succeeding layer is wound.

It is, therefore, the main object of my invention to provide a machine which is simple and which may be relied upon to support and wind the coils in flat spirals. I attain this object by utilizing a stationary and a rotatable presser plate both of annular shape and a member made of flexible material such as molded rubber placed between these two plates. When pressure is applied in such a direction that there is a tendency to compress all three of these members, a conductor may be fed between the rotatable presser plate and the flexible member and it will be gripped and held by this flexible member. The flexible member is also arranged with a plurality of projections or serrations on that surface which grips the wire so that these projections may be compressed by the wire as it is wound, while that space which is to be occupied by the spiral when it is completed allows these projections to be uncompressed. In this way those spirals which are already wound are well supported and there is no danger that any of them will unwind or become displaced in any way.

Another object of my invention is to provide a feeding means for the conductor which will automatically cause the feeding nozzle to be reciprocated at the proper rate and after the proper amount of travel to wind the layer. Other objects and advantages of my invention will become apparent as the description proceeds.

For a better understanding of my invention, reference is to be had to the following specification with the accompanying drawings, in which Fig. 1 is a perspective view of the entire machine; Fig. 2 is a top plan view of the same; Fig. 3 is a longitudinal sectional view taken through the center of the machine; Fig. 4 is a detail view, showing the feeding nozzle; Fig. 5 is a view of a part of the flexible member interposed between the stationary and rotatable presser plates; Fig. 6 is a detail section of this flexible member showing how the elastic projections are formed on one of the surfaces of this member; Fig. 7 shows a similar section but with these projections compressed due to the fact that a conductor is now located underneath them; Fig. 8 is a view showing a detail of the feeding mechanism; and Fig. 9 is a view showing the reversing mechanism for the feed whereby the feeding nozzle is reciprocated.

Referring now more in detail to the drawings in which like reference characters refer to like parts throughout, there is provided a stationary platform or table 11 appropriately supported for holding all of the parts of the machine. Passing through this platform is a shaft 12, which forms the main shaft of the machine. Upon this shaft there is splined a rotatable presser plate 13 having an annular surface 14, upon which the coil 15 is wound. The platform 11 has an annular surface 16 which coacts with the annular surface 14. The table member 11 is cut away for a small portion of the circumference of the annular surface 16, as at 17. This annular surface 16 forms in effect a stationary presser plate. The spool supporting body 18 is appropriately held to the rotatable presser plate 13 and passes through an aperture 19 in the platform 11.

It is evident that a conductor 20 may be fed between the rotatable presser plate 13 and the stationary presser plate 16, as for example through a nozzle 21 and that if the rotatable presser plate be rotated the conductor 20 would be gripped between these two presser plates. For this purpose a pressure may be applied between the two presser plates as by means of pulley and weight arrangement 22 connected to the hub 53 of the presser plate 13 shown in Fig. 1. It is evident that by this means the pressure between the two plates may be controlled by varying the amount of the weights carried on the string 23.

While such an arrangement as I have disclosed above may operate fairly well to wind a coil, I find that a much better feeding and gripping action may be obtained by interposing a flexible annular member 24 between the stationary presser plate 16 and the rotatable presser plate 13 and so arranged that it may slide on the stationary presser plate surface easily and that it may grip the conductor with a considerable friction on its other surface. For this purpose the member 24 may appropriately be made as shown in Figs. 5 and 6; the upper part may be of fabric easily slidable on a metal surface, while the main portion of the flexible member may be made of such a material as molded soft rubber and may further be provided with a series of serrations or projections 26 and 27, capable of compression, the projections 26 being longer than the projections 27 as clearly shown in Fig. 6. I have found that when such a flexible member is interposed and the machine started, the conductor will be gripped with a considerable force and will be pulled between the rotatable presser plate 13 and the flexible member 24.

The cutaway portion 17 of the stationary presser plate 16 is used for the feeding in point. In other words, the major portion of the coacting annular surfaces of the stationary and rotatable presser plates, as well as the flexible member 24, is placed under pressure due to the weight and pulley arrangement 22, but a part, corresponding to the portion 17, is left without pressure so that there is a bite formed at the boundary between the surfaces under pressure and those not under pressure. Also I preferably make the annular flexible member 24 of such dimensions that it has a somewhat longer length when developed about a mid-circumference than the cooperating annular surface of the rotatable presser plate 13. This has the effect of raising portion 28 of the flexible member away from the presser plate 13, as shown in Fig. 1, so that the conductor 20 may be easily inserted between them. When the machine is rotated, this raised portion 28 is a constantly varying part of the flexible member 24, and constitutes a "standing wave". As more layers of the coil 15 are wound, it is evident that the presser plate 13 is pressed further and further away from the stationary plate 16, due to the fact that the pressure exerted by the weight arrangement 22 is a yielding one. The surface of the flexible member 24 which carries the projections 26 and 27 has such a large friction on the surface of the conductor 20 as it is wound or on the surface of the rotatable presser plate 13 before any layer is completed that there is inappreciable relative movement between this surface of the flexible member 24 and the surface of the rotatable presser plate when the machine is rotated.

As a flat spiral is wound on the machine, it is evident that the projection 26 will be compressed by the conductor as it is wound, in the manner shown in Fig. 7. In that portion of the space in which the layer being wound is to be located, but which is not as yet occupied by the conductor, these projections 26 will contact with the previously wound layer. In this way those layers which are already wound are properly supported by these projections 26. When a layer or spiral is completely wound, the conductor 20 is fed back again to wind the next layer and the rotatable presser plate 13 is pushed away by this next layer against the action of the weight arrangement 22.

While the feeding of the conductor 20 may be effected manually so as to form these layers or spirals properly, it is advantageous to operate the feed automatically from the main shaft 12 of the machine. With my improved feeding mechanism, I adjust for the size of the conductor, as well as for the width of the layers. I perform these desirable functions by the use of an adjustable cam member 29, in which the cam surface is formed by a diagonal slot 30 in this cam member 29. This slot accommodates a pin 31 connected to the end of a push rod 32 appropriately guided in a stationary guide 33 and serving to reciprocate a carrier 34 which carries the nozzle 21. The carrier 34 slides on a stationary guide 35. It is evident that when the cam member 29 is moved, say in the right-hand direction as seen in Fig. 2, the push rod 32 is depressed and the nozzle 21 carrying the conductor 20 is moved away from the center of the shaft 12. A movement in the reverse direction of the cam member 29 causes a reverse movement of the nozzle 21. The reciprocations of the cam 29 to reciprocate the nozzle 21 as successive layers are wound is effected by any well known form of reversing mechanism such for example as the pair of opposed bevel gears 36 and 37 mechanically connected together as shown in Fig. 9, and splined to a shaft 38. Serving to drive either one or the other of these bevel gears 36 and 37, is a bevel gear 38' driven mechanically from the main shaft 12 as by means of the gearing 39 shown in Fig. 1. There is provided a sliding rod 40 appropriately supported in a stationary guide 41. The rod 40 carries adjustable stops 42 and 43. This slide rod 40 when actuated serves to cause the disengagement of one of the bevel gears 36 or 37 from the driving gear 38', and the engagement of the other, whereby rotation of the screw shaft 38 is reversed. The screw shaft serves to move a slidable rod 44 supported in a guide member 45 and connected to the cam member 29. The cam member 29 is also guided by means of the rod 46 supported in the guide 47. The sliding rod 44 carries a nut 48 coacting with the screw threads 49 on the screw shaft 38. It is evident that the number of revolutions made by the screw shaft 38 is proportional to the number of revolutions made by the shaft 12, and therefore the movement to the right or left of the cam member 29 is also proportional to this number. When the rod 44 coacts with either of the stops 42 or 43 it serves to push the rod 40 in one direction or the other, and to reverse the direction of rotation of the screw shaft 38. By properly setting the stops 42 and 43 it is possible to determine how many revolutions the shaft 12 will make before this reversal is effected. Since the revolutions of shaft 12 correspond to the number of turns of wire it is evident that when the cam member 29 is reciprocated by this means, the adjustment obtained by proper positioning of the stops 42 and 43, determines the number of turns it is desired to wind in one layer.

To adjust for the size of the conductor the cam member 29 is made adjustable by means of the clamps 50 and arcuate slots 51 and 52. By means of these slots and clamps it is possible to rotate the entire cam member 29 about its center so as to vary the inclination of the slot 30. It is evident that in order to compensate for the size of the conductor the amount which the rod 32 travels for one revolution of the shaft 12 must be controlled. By varying the inclination of the slot 30 this may easily be effected. For example, if the cam member 29 be slightly rotated in a counterclockwise direction from the position shown and held there, the rod 32 may be moved a greater distance for the same movement of the cam 29.

The nozzle member 21 is provided with a wave-formed slot cut completely through it, as shown in Fig. 4, by means of which it is possible to insert the conductor 20 without it being necessary to thread the conductor through it. The slot is made wave-formed so that while the machine is operated and the wire straight, the conductor cannot come out of the nozzle.

The operation of the machine may be explained as follows: Before the shaft 12 is rotated the cam member 29 is adjusted for the size of conductor that is to be wound and stops 42 and 43 are also adjusted for the number of turns in each layer. The conductor 20 is then placed into the nozzle 21. Push rod 32 and the slidable support 34 is moved to one extreme position or the other; if necessary, by rotation of shaft 12. The conductor 20 is then anchored in any appropriate means to the rotatable presser plate 13 or to the spool 18. The machine is then started. The first layer, for example, may be wound from the inside to the outside. After the first layer is wound the slidable support 34 has its motion automatically reversed and the second layer is wound in the same manner as the first. The conductor 20 is gripped in the bite between the lower surface of the flexible member 24 and the rotatable presser plate 13 while the first layer is wound. For succeeding layers the conductor is gripped between the previously wound layer and the lower surface of the flexible member 24. In order to wind coils of various sizes or shapes it is merely necessary to vary the diameter and length of cylinder 18 and the diameter of the aperture through which the cylinder passes. The amount of feed may be easily adjusted in the manner hereinbefore described.

While I have shown in the accompanying drawings but one embodiment of my invention, I do not wish to be limited thereto but aim to embrace in the appended claims all modifications falling fairly within the scope of my invention.

What I claim as new and desire to secure by Letters Patent of the United States, is,—

1. In a machine for winding coils in flat spirals, a rotatable presser plate, a stationary presser plate, a thin flexible member for gripping a conductor interposed between said plates, said flexible member being so arranged that it may slide on the stationary plate, and means for yieldingly pressing said plates together.

2. In a machine for winding coils in flat spirals, a rotatable presser plate having an annular surface, means for rotating said plate, a thin flexible member having an annular surface, a stationary presser plate between which plate and the rotatable presser plate the flexible member is located, said stationary plate covering only a major portion of the annular surface of the flexible member, means for exerting a pressure tending to force both plates together, the surface of the flexible member which is in contact with the stationary plate being slidable thereon, and means for feeding a conductor at the other surface of the flexible member and where there is no pressure applied.

3. In a machine for winding coils in flat spirals, a rotatable presser plate, a stationary presser plate, a thin flexible member for gripping a conductor interposed between said plates, said flexible member being provided with compressible serrations on that surface which grips the conductor, and having its opposite surface of such a nature that it may slide on the stationary plate, and means for yieldingly pressing said plates together.

4. In a machine for winding coils in flat spirals, a pair of relatively movable presser plates, a flexible member provided with serrations on one of its surfaces interposed between said plates and arranged to slide on its opposite surface, and means for yieldingly urging said plates together with a constant but adjustable pressure.

5. In a machine for winding coils in flat spirals, a rotatable presser plate having a flat annular surface, an annular flexible member coacting therewith having different sized compressible projections on its surface opposed to the annular surface of the plate, and means for yieldingly pressing the plate and member toward each other, whereby a conductor may be pulled and gripped between the flexible member and the plate when the plate is rotated.

6. In a machine for winding coils in flat spirals, a rotatable presser plate having an annular surface for supporting a coil, an annular flexible member having a surface provided with compressible projections, said surface coacting with that of the presser plate so that a coil with a partially wound section may be supported between these two annular surfaces, and means for producing a pressure between the flexible member and presser plate over a portion only of the annular surfaces, whereby a bite is obtained for feeding in a conductor at the boundary between the surfaces under pressure and those not under pressure.

7. In a machine for winding coils in a series of layers, a rotatable support for the coil, a nozzle for feeding the conductor, a slidable support for said nozzle, a reciprocating movable cam member having a cam surface, the inclination of which is adjustable, means whereby movement of the cam member effects movement of the nozzle at a rate dependent upon the setting of the cam surface, means driven from the rotatable coil support for imparting movement to said cam, and means for reversing said movement after a definite number of revolutions of the rotatable support.

8. In a machine for winding coils in a series of layers, a rotatable support for the coil, a nozzle for feeding the conductor, a slidable support for said nozzle, and means for reciprocating the nozzle upon said support for winding the layers comprising a reciprocating cam member adjustable to take care of the width of the conductor being wound, and means for adjusting the travel of said cam member in either direction to take care of the number of turns in each layer.

In witness whereof, I have hereunto set my hand this fourteenth day of February, 1921.

EDWARD D. TREANOR.